US010782171B2

(12) United States Patent
Stack et al.

(10) Patent No.: US 10,782,171 B2
(45) Date of Patent: Sep. 22, 2020

(54) SYSTEM, METHOD, AND COMPUTER PROGRAM PRODUCT FOR DETECTING A PROCESS DISTURBANCE IN A VIBRATING FLOW DEVICE

(71) Applicants: Charles Paul Stack, Broomfield, CO (US); Joel Weinstein, Boulder, CO (US)

(72) Inventors: Charles Paul Stack, Broomfield, CO (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 1164 days.

(21) Appl. No.: 14/049,431

(22) Filed: Oct. 9, 2013

(65) Prior Publication Data
US 2014/0039814 A1 Feb. 6, 2014

Related U.S. Application Data

(62) Division of application No. 12/864,346, filed as application No. PCT/US2008/053556 on Feb. 11, 2008, now Pat. No. 8,589,091.

(51) Int. Cl.
*G01F 1/00* (2006.01)
*G01F 1/84* (2006.01)
(Continued)

(52) U.S. Cl.
CPC .............. *G01F 1/8468* (2013.01); *G01F 1/74* (2013.01); *G01F 1/8409* (2013.01); *G01F 1/8477* (2013.01); *G01F 25/0007* (2013.01)

(58) Field of Classification Search
CPC ........ G01F 1/8468; G01F 1/74; G01F 1/8409; G01F 1/8477; G01F 25/0007
(Continued)

(56) References Cited

U.S. PATENT DOCUMENTS

| 6,505,135 B2 * | 1/2003 | Maginnis .............. G01F 1/8418 |
| | | 702/100 |
| 2002/0100505 A1 * | 8/2002 | Keilty .................. G05D 7/0688 |
| | | 137/487.5 |

(Continued)

FOREIGN PATENT DOCUMENTS

| CN | 1166199 A | 11/1997 |
| JP | 2003513234 A | 4/2003 |

(Continued)

*Primary Examiner* — Toan M Le
*Assistant Examiner* — Xiuqin Sun
(74) *Attorney, Agent, or Firm* — The Ollila Law Group LLC (57) ABSTRACT

The present invention relates to a system, a method, and a computer program product for detecting a process disturbance from entrained gas or particulates within a fluid flowing in a vibrating flow device (5). In one embodiment, the system, the method and the computer program may involve a comparison between a measured drive gain and a drive gain threshold value and a comparison between a void fraction and a void fraction threshold value. In another embodiment, the system, the method and the computer program may involve a comparison between a measured drive gain and a drive gain threshold value, a comparison between a void fraction and a void fraction threshold value, and a comparison between a measured mass flow rate and a nominal mass flow rate threshold value. In yet another embodiment, the system, the method and the computer program may involve a comparison between a measured drive gain and a drive gain threshold value and a comparison between a measured pick-off amplitude and a pick-off amplitude threshold value.

9 Claims, 1 Drawing Sheet

(51) Int. Cl.
*G01F 25/00* (2006.01)
*G01F 1/74* (2006.01)

(58) Field of Classification Search
USPC .......................................................... 702/48
See application file for complete search history.

(56) References Cited

U.S. PATENT DOCUMENTS

| | | |
|---|---|---|
| 2005/0016292 A1 | 1/2005 | Dutton et al. |
| 2007/0191990 A1 | 8/2007 | Duan et al. |
| 2008/0189067 A1* | 8/2008 | Duffill .................... G01F 1/74 702/113 |

FOREIGN PATENT DOCUMENTS

| | | |
|---|---|---|
| JP | 2007286052 | 1/2007 |
| WO | 9605484 A1 | 2/1996 |
| WO | 0019175 A | 4/2000 |
| WO | 0131298 A2 | 5/2001 |

\* cited by examiner

SYSTEM, METHOD, AND COMPUTER PROGRAM PRODUCT FOR DETECTING A PROCESS DISTURBANCE IN A VIBRATING FLOW DEVICE

CROSS-REFERENCE TO RELATED APPLICATIONS

This is a divisional application of U.S. application Ser. No. 12/864,346 filed on Jul. 23, 2010 entitled "A SYSTEM, METHOD, AND COMPUTER PROGRAM PRODUCT FOR DETECTING A PROCESS DISTURBANCE IN A VIBRATING FLOW DEVICE" which is a National Stage application of International Application no. PCT/US08/53556 filed Feb. 11, 2008.

FIELD OF THE INVENTION

The present invention relates to a system, method, and computer program product for detecting a process disturbance from entrained gas or particulates within a fluid flowing in a vibrating flow device.

BACKGROUND OF THE INVENTION

Vibrating flow devices such as, for example, densitometers and Coriolis flow meters are used for measuring a characteristic of flowing substances, such as, for example, density, mass flow rate, volume flow rate, totalized mass flow, temperature, and other information. Vibrating flow devices include one or more conduits, which may have a variety of shapes, such as, for example, straight, U-shaped, or irregular configurations.

The one or more conduits have a set of natural vibration modes, including, for example, simple bending, torsional, radial, and coupled modes. The one or more conduits are vibrated by at least one drive at a resonance frequency in one of these modes for purposes of determining a characteristic of the flowing substance. One or more electronics transmit a sinusoidal drive signal to the at least one drive, which is typically a magnet/coil combination with the magnet typically being affixed to the conduit and the coil being affixed to a supporting structure or to another conduit. The drive signal causes the drive to vibrate the one or more conduits at the drive frequency in the drive mode. For example, the drive signal may be a periodic electrical current transmitted to the coil.

At least one pick-off detects the motion of a conduit and generates a sinusoidal pick-off signal representative of the motion of the vibrating conduit(s). The pick-off signal is transmitted to the one or more electronics; and according to well known principals the pick-off signal may be used by the one or more electronics to determine a characteristic of the flowing substance or adjust the drive signal, if necessary.

One problem that can occur in the data output from a vibrating flow device is an erroneous reading generated by sudden changes in the material. In particular, if the flowing substance is a liquid and there are particulates and/or gas bubbles in the liquid, this can cause large and inaccurate variations in the output.

The present invention is directed to overcoming this disadvantage inherent in prior vibrating flow devices.

SUMMARY OF THE INVENTION

The scope of the present invention is defined solely by the appended claims, and is not affected to any degree by the statements within this summary.

In one embodiment of the present invention, a method for detecting a process disturbance generated from entrained gas or particulates within a fluid flowing in a vibrating flow device includes the steps of measuring a drive gain, determining a void fraction, and detecting the presence of the process disturbance based upon a comparison between the measured drive gain and a drive gain threshold value and a comparison between the void fraction and a void fraction threshold value.

In another embodiment of the present invention, a method for detecting a process disturbance generated from entrained gas or particulates within a fluid flowing in a vibrating flow device includes the steps of measuring a drive gain, measuring a pick-off amplitude, and detecting the presence of the process disturbance based upon a comparison between a measured drive gain and a drive gain threshold value and a comparison between a measured pick-off amplitude and a pick-off amplitude threshold value.

In yet another embodiment of the present invention, a computer program product comprises computer usable medium including executable code for executing a process for detecting a process disturbance generated from entrained gas or particulates within a fluid flowing in a vibrating flow device, the process including detecting the presence of the process disturbance based upon a comparison between a measured drive gain and a drive gain threshold value and a comparison between a void fraction and a void fraction threshold value.

In still another embodiment of the present invention, a computer program product comprises computer usable medium including executable code for executing a process for detecting a process disturbance generated from entrained gas or particulates within a fluid flowing in a vibrating flow device, the process including detecting the presence of the process disturbance based upon a comparison between a measured drive gain and a drive gain threshold value and a comparison between a measured pick-off amplitude and a pick-off amplitude threshold value.

In a further embodiment of the present invention, a system for detecting a process disturbance generated from entrained gas or particulates within a fluid flowing in a vibrating flow device includes at least one conduit, at least one drive, at least one pick-off, and one or more electronics. The at least one conduit is configured to receive a fluid. The at least one drive is configured to vibrate the at least one conduit. The at least one pick-off is configured to measure the motion of the at least one conduit. The one or more electronics are configured to detect the process disturbance based upon a comparison between a measured drive gain and a drive gain threshold value and a comparison between a void fraction and a void fraction threshold value.

In yet a further embodiment of the present invention, a system for detecting a process disturbance generated from entrained gas or particulates within a fluid flowing in a vibrating flow device includes at least one conduit, at least one drive, at least one pick-off, and one or more electronics. The at least one conduit is configured to receive a fluid. The at least one drive is configured to vibrate the at least one conduit. The at least one pick-off is configured to measure the motion of the at least one conduit. The one or more electronics are configured to detect the process disturbance based upon a comparison between a measured drive gain and a drive gain threshold value and a comparison between a measured pick-off amplitude and a pick-off amplitude threshold value.

ASPECTS

According to one aspect of the present invention, a method for detecting a process disturbance generated from entrained gas or particulates within a fluid flowing in a vibrating flow device comprises the steps of:

measuring a drive gain;

determining a void fraction; and detecting the presence of the process disturbance based upon a comparison between the measured drive gain and a drive gain threshold value and a comparison between the void fraction and a void fraction threshold value.

Preferably, the comparison between the measured drive gain and the drive gain threshold includes determining whether the measured drive gain is substantially equal to the drive gain threshold value Preferably, the comparison between the measured drive gain and the drive gain threshold includes determining whether the measured drive gain is less than the drive gain threshold value.

Preferably, the comparison between the void fraction and the void fraction threshold value includes determining whether the void fraction is less than the void fraction threshold value.

Preferably, the comparison between the void fraction and the void fraction threshold value includes determining whether the void fraction is greater than the void fraction threshold value.

Preferably, the comparison between the measured drive gain includes determining whether the measured drive gain is substantially equal to the drive gain threshold value and the comparison between the void fraction and the void fraction threshold value includes determining whether the void fraction is greater than the void fraction threshold value.

Preferably, the method further comprises outputting information, recommending one or more actions, or performing one or more actions that reduce the severity of the process disturbance or reduce a deleterious affect the process disturbance has on accuracy of a characteristic measured by the vibrating flow device.

Preferably, the method further comprises detecting the presence of the process disturbance based upon a comparison between a measured mass flow rate and a nominal mass flow rate threshold value.

Preferably, the comparison between the measured drive gain and the drive gain threshold includes determining whether the measured drive gain is substantially equal to the drive gain threshold value.

Preferably, the comparison between the measured drive gain and the drive gain threshold includes determining whether the measured drive gain is less than the drive gain threshold value.

Preferably, the comparison between the void fraction and the void fraction threshold value includes determining whether the void fraction is less than the void fraction threshold value.

Preferably, the comparison between the measured mass flow rate and the nominal mass flow rate threshold value includes determining whether the measured mass flow rate is greater than the nominal mass flow rate threshold value.

Preferably, the comparison between the measured mass flow rate and the nominal mass flow rate threshold value includes determining whether the measured mass flow rate is less than the nominal mass flow rate threshold value.

Preferably, the comparison between the measured drive gain and the drive gain threshold includes determining whether the measured drive gain is less than the measured drive gain threshold value, the comparison between the measured mass flow rate and the nominal mass flow rate threshold value includes determining whether the measured mass flow rate is greater than the nominal mass flow rate threshold value, and the comparison between the void fraction and the void fraction threshold value includes determining whether the void fraction is less the void fraction threshold value.

Preferably, the comparison between the measured drive gain and the drive gain threshold includes determining whether the measured drive gain is substantially equal to the drive gain threshold value, the comparison between the measured mass flow rate and the nominal mass flow rate threshold value includes determining whether the measured mass flow rate is less than the nominal mass flow rate threshold value, and the comparison between the void fraction and the void fraction threshold value includes determining whether the void fraction is less than the void fraction threshold value.

Preferably, the method further comprises outputting information, recommending one or more actions, or performing one or more actions that reduce the severity of the process disturbance or reduce a deleterious affect the process disturbance has on accuracy of a characteristic measured by the vibrating flow device.

According to another aspect of the present invention, a method for detecting a process disturbance generated from entrained gas or particulates within a fluid flowing in a vibrating flow device comprises the steps of:

measuring a drive gain;

measuring the pick-off amplitude; and detecting the presence of the process disturbance based upon a comparison between the measured drive gain and a drive gain threshold value and a comparison between the measured pick-off amplitude and a pick-off amplitude threshold value.

Preferably, the comparison between the measured drive gain and the drive gain threshold includes determining whether the measured drive gain is substantially equal to the drive gain threshold value.

Preferably, the comparison between the measured pick-off amplitude and the pick-off amplitude threshold value includes determining whether the measured pick-off amplitude is greater than the pick-off amplitude threshold value.

Preferably, the comparison between the measured pick-off amplitude and the pick-off amplitude threshold value includes determining whether the measured pick-off amplitude is less than the pick-off amplitude threshold value.

Preferably, the comparison between the measured drive gain and the drive gain threshold includes determining whether the measured drive gain is substantially equal to the drive gain threshold value and the comparison between the measured pick-off amplitude and the pick-off amplitude threshold value includes determining whether the measured pick-off amplitude is greater than the pick-off amplitude threshold value.

Preferably, the comparison between the measured drive gain and the drive gain threshold includes determining whether the measured drive gain is substantially equal to the drive gain threshold value and the comparison between the measured pick-off amplitude and the pick-off amplitude threshold value includes determining whether the measured pick-off amplitude is less than the pick-off amplitude threshold value.

Preferably, the method further comprises outputting information, recommending one or more actions, or performing one or more actions that reduce the severity of the process disturbance or reduce a deleterious affect the process disturbance has on accuracy of a characteristic measured by the vibrating flow device.

According to yet another aspect of the present invention, a computer program product comprising computer usable medium including executable code for executing a process for detecting a process disturbance generated from entrained gas or particulates within a fluid flowing in a vibrating flow device, the process comprising:

detecting the presence of the process disturbance based upon a comparison between a measured drive gain and a drive gain threshold value and a comparison between a void fraction and a void fraction threshold value.

Preferably, the process further comprises detecting the presence of the process disturbance based upon a comparison between a measured mass flow rate and a nominal mass flow rate threshold value.

According to still another aspect of the present invention, computer program product comprising computer usable medium including executable code for executing a process for detecting a process disturbance generated from entrained gas or particulates within a fluid flowing in a vibrating flow device, the process comprising:

detecting the presence of the process disturbance based upon a comparison between a measured drive gain and a drive gain threshold value and a comparison between a measured pick-off amplitude and a pick-off amplitude threshold value.

According to a further aspect of the present invention, a system for detecting a process disturbance generated from entrained gas or particulates within a fluid flowing in a vibrating flow device comprises:

at least one conduit configured to receive a fluid;

at least one drive that is configured to vibrate the at least one conduit;

at least one pick-off that is configured to measure the motion of the at least one conduit;

one or more electronics that are configured to detect the process disturbance based upon a comparison between a measured drive gain and a drive gain threshold value and a comparison between a void fraction and a void fraction threshold value.

Preferably, the one or more electronics are configured to detect the presence of the process disturbance based upon a further comparison between a measured mass flow rate and a nominal mass flow rate threshold value.

According to yet a further aspect of the present invention, a system for detecting a process disturbance generated from entrained gas or particulates within a fluid flowing in a vibrating flow device comprises:

at least one conduit configured to receive a fluid;

at least one drive that is configured to vibrate the at least one conduit;

at least one pick-off that is configured to measure the motion of the at least one conduit;

one or more electronics that are configured to detect the process disturbance based upon a comparison between a measured drive gain and a drive gain threshold value and a comparison between a measured pick-off amplitude and a pick-off amplitude threshold value.

DETAILED DESCRIPTION OF THE PRESENTLY PREFERRED EMBODIMENT

Figure 1:
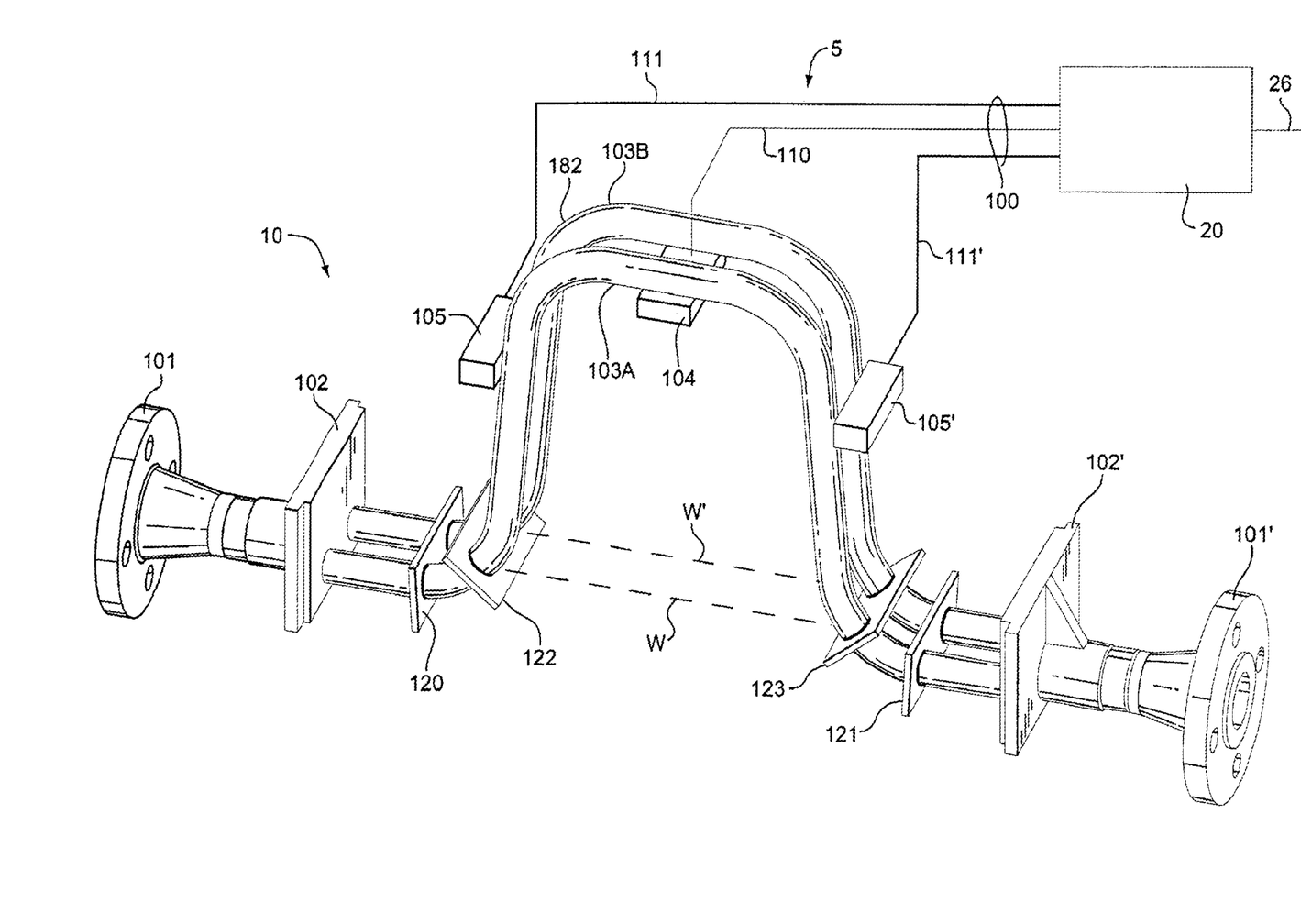
FIG. 1 depicts a perspective view of a vibrating flow device of an embodiment of the present invention.

FIG. 1 illustrates an example of a vibrating flow device 5 in the form of a Coriolis flow meter comprising a sensor assembly 10 and one or more electronics 20. The one or more electronics 20 are connected to sensor assembly 10 via leads 100 to measure a characteristic of a flowing substance, such as, for example, density, mass flow rate, volume flow rate, totalized mass flow, temperature, and other information over path 26.

The sensor assembly 10 of the present example includes a pair of flanges 101 and 101'; manifolds 102 and 102'; drive 104; pick-offs 105-105'; conduits 103A and 103B, and brace bars 120-124. Manifolds 102, 102' are affixed to opposing ends of the conduits 103A, 103B. Drive 104 and pick-offs 105 and 105' are connected to conduits 103A and 103B. The drive 104 is affixed to conduits 103A, 103B in a position where the drive 104 can vibrate the conduits 103A, 103B in opposition to one another. Pick-offs are affixed to conduits 103, 103B at opposing ends to detect the phase difference in the vibrations at opposing ends of the conduits 103A, 103B. It should be apparent to those skilled in the art that it is within the scope of the present invention to use the principals discussed herein in conjunction with any type of vibrating flow device, including, for example, densitometers, regardless of the number of conduits, the number of drives, the number of pick-offs, the operating mode of vibration or the determined characteristic of the flowing substance.

Flanges 101 and 101' of the present example are affixed to manifolds 102 and 102' and connect conduits 103A, 103B to a pipeline (not shown). When sensor assembly 10 is inserted into a pipeline system (not shown) which carries the flowing substance, the substance enters sensor assembly 10 through flange 101, passes through inlet manifold 102 where the total amount of material is directed to enter conduits 103A and 103B, flows through conduits 103A and 103B, and back into outlet manifold 102' where it exits the sensor assembly 10 through flange 101'.

Conduits 103A and 103B are preferably selected and appropriately mounted to inlet manifold 102 and outlet manifold 102' so as to have substantially the same mass distribution, moments of inertia, and elastic modules about bending axes W-W and W'-W' respectively. The conduits extend outwardly from the manifolds in an essentially parallel fashion. Although the conduits 103A, 103B are shown provided with a generally U-shape, it is within the scope of the present invention to provide the conduits 103A, 103B with other shapes, such as, for example, straight or irregular shapes.

In the present example, conduits 103A-B are driven by drive 104 in opposite directions about their respective bending axes W and W' and at what is termed the first out of phase bending mode of the flow meter. Drive 104 may comprise one of many well known arrangements, such as a magnet mounted to conduit 103A and an opposing coil mounted to conduit 103B. An alternating current is passed through the opposing coil to cause both conduits 103A, 103B to oscillate. A suitable drive signal is applied by one or more electronics 20, via lead 110 to drive 104.

In the present example, the one or more electronics 20 produces a drive signal and transmits it to the drive 104 via lead 110, which causes drive 104 to oscillate conduits 103A and 103B. It is within the scope of the present invention to produce multiple drive signals for multiple drives, however. One or more electronics 20 processes left and right velocity signals from pick-offs 105, 105' to compute mass flow rate. Path 26 provides an input and an output means that allows one or more electronics 20 to interface with an operator. An explanation of the circuitry of one or more electronics 20 is unneeded to understand the present invention and is omitted for brevity of this description. Furthermore, the description of FIG. 1 is provided merely as an example of the operation of one possible vibrating flow device and is not intended to limit the teaching of the present invention.

According to one aspect of the present embodiment, the one or more electronics 20 are configured to determine the presence of a process disturbance, which occurs when gas bubbles or particulates are entrained in a fluid that flows through the conduits 103A, 103B. According to another aspect of the present embodiment, the one or more electronics 20 are configured to determine the severity of the process disturbance. More particularly, Applicants have discovered that certain parameters, particularly, various combinations of drive gain, mass flow rate, void fraction, and pick-off amplitude parameters, when compared to respective threshold values, are highly useful for purposes of determining the presence of a process disturbance and the severity of the process disturbance. The comparison may be based on a relationship between the parameters and their respective threshold values. As used herein, a "relationship" comprises greater than, less than, and equal to. A comparison based only on whether a parameter exceeds a threshold value or is within a range is not a comparison based on a relationship.

According to one aspect of the present embodiment, the presence and severity of a process disturbance may be affirmed by determining the relationship between the drive gain and a drive gain threshold value. As used herein, the term drive gain refers to a measure of the amount of power needed to drive the flow tubes to specified amplitude. This value ranges from a low nominal value of around 5% for a single phase fluid to a value of 100% for a multiphase fluid.

According to another aspect of the present embodiment, the presence and severity of a process disturbance may be affirmed by determining the relationship between the substance's mass flow rate and a nominal mass flow rate threshold value. As used herein, the nominal mass flow rate refers to the flow rate for which one atmosphere, or 101.3 kPa, of pressure is dropped from the inlet to the outlet of the flow meter.

According to yet another aspect of the present embodiment, the presence and severity of a process disturbance may be affirmed by determining the relationship between the substance's void fraction and a void fraction threshold value. As used herein, the term void fraction refers to the volume of the gas phase divided by the total volume of the flow tube.

According to still another aspect of the present embodiment, the presence and severity of a process disturbance may be affirmed by determining the relationship between the pick-off's or pick-offs' amplitude and a pick-off amplitude threshold value. As used herein, the pick-off amplitude refers to the voltage of the of the pick-off signal generated by one or more pick-offs, such as, for example, pick-offs 105 and 105'.

In one embodiment of the present invention, the presence and severity of a process disturbance may be affirmed by determining the relationship between the measured drive gain and a drive gain threshold value, the relationship between the measured mass flow rate and a nominal mass flow rate threshold value, and the relationship between the void fraction and a void fraction threshold value. More particularly, in one embodiment of the present invention, the presence and severity of a process disturbance may be affirmed by determining whether the measured drive gain exceeds drive gain threshold value, whether the measured mass flow rate exceeds a nominal mass flow rate threshold value, and whether the void fraction is less than a void fraction threshold value. By way of example, and not limitation, in one embodiment of the present invention, the presence of a minor process disturbance may be affirmed where:

Measured Drive Gain<100%;
Measured Mass Flow Rate ("M")>0.04 of the Nominal Mass Flow Rate ("$M_{Nom}$"); and
Void Fraction<0.2

In another embodiment of the present invention, the presence and severity of a process disturbance may be affirmed by determining the relationship of the measured drive gain to a drive gain threshold value and the relationship of the measured amplitude of one or more the pick-off signals to a pick-off amplitude threshold value. More particularly, in another embodiment of the present invention, the presence and severity of a process disturbance may be affirmed by determining the whether the measured drive gain equals a drive gain threshold value and whether the measured amplitude of the one or more pick-off signals exceed a pick-off amplitude threshold value. By way of example, and not limitation, in one embodiment of the present invention, the presence of a significant process disturbance may be affirmed where:

Measured Drive Gain=100%; and
Measured Pick-off Amplitude ("PO")>0.07 Volts

In yet another embodiment of the present invention, the presence and severity of a process disturbance may be affirmed by determining the relationship between the measured drive gain and a drive gain threshold value, the relationship between the measured mass flow rate and a nominal mass flow rate threshold value, and the relationship between the void fraction and a void fraction threshold value. More particularly, in yet another embodiment of the present invention, the presence and severity of a process disturbance may be affirmed by determining whether the measured drive gain equals a drive gain threshold value, whether the measured mass flow rate is less than a nominal mass flow rate threshold value, and whether the void fraction is less than a void fraction threshold value. By way of example, and not limitation, in yet another embodiment of the present invention, the presence of a significant process disturbance may be affirmed where:

Measured Drive Gain=100%;
Measured Mass Flow Rate ("M")<0.04 of the Nominal Mass Flow Rate ("$M_{Nom.}$"); and
Void Fraction<0.2

In still another embodiment of the present invention, the presence and severity of a process disturbance may be affirmed by determining the relationship of the measured drive gain to a drive gain threshold value and the relationship of the measured amplitude of one or more pick-offs to a pick-off amplitude threshold value. More particularly, in still another embodiment of the present invention, the presence and severity of a process disturbance may be affirmed by determining the whether the measured drive gain equals a drive gain threshold value and whether the measured amplitude of one or more pick-offs is less than a pick-off amplitude threshold value. By way of example, and not limitation, in still another embodiment of the present invention, the presence of a severe process disturbance may be affirmed where:

Measured Drive Gain=100%; and
Measured Pick-off Amplitude ("PO")<0.07 Volts

In yet a further embodiment of the present invention, the presence and severity of a process disturbance may be affirmed by determining the relationship of the measured drive gain to a drive gain threshold value and the relationship of the void fraction to a void fraction threshold value. More particularly, in yet a further embodiment of the present invention, the presence and severity of a process disturbance may be affirmed by determining the whether the measured drive gain equals a drive gain threshold value and whether the void fraction exceeds a void fraction threshold value. By way of example, and not limitation, in yet a further embodiment of the present invention, the presence of a severe process disturbance may be affirmed where:

Measured Drive Gain=100%; and
Void Fraction>0.2

Those of ordinary skill in the art will appreciate that it is within the scope of the present invention for the one or more electronics 20 to determine the presence or severity of a process disturbance through any one or any combination of the above-mentioned disclosed relationships. Furthermore, those of ordinary skill in the art will appreciate that the determined threshold values will depend on a variety of factors, such as, for example, and not limitation, meter size, meter frequency, flow tube shape, flow tube size, electronics package, drive assembly design, pick-off assembly design, installation orientation, and various other meter design parameters. Within the scope of the present invention, the specific threshold values may be established empirically. For example, and not limitation, empirical testing may be conducted in a flow facility involving a reference liquid meter, a reference gas meter, a pressure sensor, a temperature sensor, and other components necessary for varying the above listed parameters and determining measurement performance of a meter over changing conditions with multiphase flow. Therefore, while the specific threshold values provided above were derived from use of a curved tube meter design with operating frequencies of around 100 Hz, the present invention is not limited to the specific threshold values provided as an example above.

According to aspects of further embodiments, the one or more electronics 20 may be configured to output certain information, recommend certain actions, or perform certain actions that may be used to reduce the severity a detected process disturbance or to reduce the affect the detected process disturbance has on the generation of accurate data. Those of ordinary skill in the art will appreciate that there are various levels of information that may be known depending on user or program input and the type of vibrating flow device. The type of information that is known may affect the type of information or actions generated by the one or more electronics 20.

By way of example, and not limitation, a first level of information may include information that will be known regardless of user or program input. Depending on the type of vibrating flow device, the first level of information may include, drive gain, pick-off amplitude ("PO"), mass flow rate ("M"), frequency of vibration ("f"), temperature ("T"), nominal mass flow rate ("$M_{Nom}$"), and any meter alarms.

By way of example, and not limitation, a second level of information may include information that will be known provided that a user or program inputs the liquid density Depending on the type of vibrating flow device, the second level of information may include the rough void fraction and the ratio between measurement errors caused by acoustic effects and measurement errors caused by motion of the gas bubbles relative to the liquid during tube oscillation.

By way of example, and not limitation, a third level of information may include information that will be known provided that a user or program inputs the line pressure ("$P_L$"), line size, pressure drop, and liquid density. Depending on the type of vibrating flow device, the third level of information may include the minimum pressure of the fluid ("$P_{min}$") and the vapor pressure of the fluid ("$P_{vapor}$").

By way of example, and not limitation, a fourth level of information may include information that will be known provided that a user or program inputs the line pressure, line size, pressure drop, liquid density, and vapor pressure of fluid ("$P_{vapor}$") at the line temperature. Depending on the type of vibrating flow device, the fourth level of information may include an indication of whether cavitation, or outgassing of bubbles into the flow material, is occurring.

By way of example, and not limitation, depending on the level of known information, the one or more electronics 20 may output, recommend, or perform the following during a minor process disturbance:

| Level of Information | Output, Recommend, or Perform |
|---|---|
| 1 | Increase pressure without decreasing flow rate to reduce gas volume fraction. |
| 2 | If $\rho$ (measured density) < $\rho_L$ (purported density) and f < 200Hz, the rough gas volume fraction is between 50% of $(\rho_L - \rho)/\rho_L$ and 125% of $(\rho_L - \rho)/\rho_L$. <br> Where: <br> f = frequency of vibration; <br> $\rho$ = density measured by the vibrating flow device; and <br> $\rho_L$ = purported density of fluid (usually user input). |
| 3 | If the minimum static pressure in the meter is approximately $P_{min}$, ensure that the vapor pressure of fluid at T is less than $P_{min}$ to avoid flashing. <br> Where: <br> T = temperature in °C; and <br> $P_{min}$ = minimum pressure of the fluid. |
| 4 | If $P_{vapor}$ > $P_{min}$ (flashing is expected), increase line pressure or decrease temperature to eliminate gas from process. <br> Where: <br> $P_{vapor}$ = vapor pressure of fluid; and <br> $P_{min}$ = minimum pressure of the fluid. |

By way of example, and not limitation, depending on the level of known information, the one or more electronics 20 may output, recommend, or perform the following during a significant process disturbance:

| Level of Information | Output, Recommend, or Perform |
|---|---|
| 1 | Increase pressure without decreasing flow rate to reduce gas volume fraction. |
| 1 | If $M < 0.3 \times M_{nom}$, increase flow rate to at least $0.5 \times M_{nom}$. (For high accuracy with gas present, it may be desirable for the flow rate to be high).<br>Where:<br>M = mass flow rate; and<br>$M_{nom}$ = nominal mass flow rate. |
| 1 | Increase the degree of mixing directly upstream of the meter. (For high accuracy with gas present, it may be desirable for the fluid to be well mixed). |
| 2 | If $\rho$ (measured density) $< \rho_L$ (purported density) and $f < 200$Hz, the rough gas volume fraction is between 50% of $(\rho_L - \rho)/\rho_L$ and 125% of $(\rho_L - \rho)/\rho_L$.<br>Where:<br>f = frequency of vibration;<br>$\rho$ = density measured by the vibrating flow device; and<br>$\rho_L$ = purported density of fluid (usually user input). |
| 3 | If the minimum static pressure in the meter is approximately $P_{min}$, ensure that the vapor pressure of fluid at T is less than $P_{min}$ to avoid flashing.<br>Where:<br>T = temperature in °C; and<br>$P_{min}$ = minimum pressure of the fluid. |
| 4 | If $P_{vapor} > P_{min}$ (flashing is expected), increase line pressure or decrease temperature to eliminate gas from process.<br>Where:<br>$P_{vapor}$ = vapor pressure of fluid; and<br>$P_{min}$ = minimum pressure of the fluid. |

By way of example, and not limitation, depending on the level of known information, the one or more electronics 20 may output, recommend, or perform the following during a severe process disturbance:

| Level of Information | Output, Recommend, or Perform |
|---|---|
| 1 | Increase pressure without decreasing flow rate to reduce gas volume fraction. |
| 1 | If $M < 0.3 \times M_{nom}$, increase flow rate to at least $0.5 \times M_{nom}$. (For high accuracy with gas present, it may be desirable for the flow rate to be high).<br>Where:<br>M = mass flow rate; and<br>$M_{nom}$ = nominal mass flow rate. |
| 1 | Increase the degree of mixing directly upstream of the meter. (For high accuracy with gas present, it may be desirable for the fluid to be well mixed). |
| 1 | If $PO < PO_{KS}$, reduce gas volume fraction (Meter not functioning correctly).<br>Where:<br>PO = pick-off amplitude; and<br>$PO_{KS}$ = the threshold value for pickoff amplitude below which the one or more electronics 20 determines that the conduits are not vibrating. Typically when the PO drops below the $PO_{KS}$, the electronics alters the drive signal sent to the drive in an attempt to induce vibrations. This, in turn, may prevent accurate measurement during a multiphase flow. |
| 2 | If $\rho$ (measured density) $< \rho_L$ (purported density) and $f < 200$Hz, the rough gas volume fraction is between 50% of $(\rho_L - \rho)/\rho_L$ and 125% of $(\rho_L - \rho)/\rho_L$.<br>Where:<br>T = temperature in °C; and<br>$P_{min}$ = minimum pressure of the fluid. |
| 3 | If the minimum static pressure in the meter is approximately $P_{min}$, ensure that the vapor pressure of fluid at T is less than $P_{min}$ to avoid flashing.<br>Where:<br>T = temperature in °C; and<br>$P_{min}$ = minimum pressure of the fluid. |

| Level of Information | Output, Recommend, or Perform |
|---|---|
| 4 | If $P_{vapor} > P_{min}$ (flashing is expected), increase line pressure or decrease temperature to eliminate gas from process.<br>Where:<br>$P_{vapor}$ = vapor pressure of fluid; and<br>$P_{min}$ = minimum pressure of the fluid. |

Those of ordinary skill in the art will appreciate that the principals of aforementioned embodiments may be programmed on a computer program product, such as software, that is installed on the one or more electronics 20.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. The detailed descriptions of the above embodiments are not exhaustive descriptions of all embodiments contemplated by the inventors to be within the scope of the invention. By way of example and not limitation, the one or more electronics 20 may be remote from the sensor assembly 10 and connected thereto in any manner, such as via an internet connection.

Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:

1. A method for detecting a process disturbance by one or more electronics (20), the process disturbance being generated from entrained gas or particulates within a fluid flowing in at least one conduit (103A, 103B) of a vibrating flow device (5), comprising the steps of:
measuring a drive gain of a drive signal provided to a drive (104) configured to vibrate the conduit (103A, 103B);
measuring a pick-off amplitude of a signal from a pick-off (105, 105') configured to measure a motion of the conduit (103A, 103B);
detecting the presence of the process disturbance based upon a combination of a relationship between the measured drive gain and a drive gain threshold value and a relationship between the measured pick-off amplitude and a pick-off amplitude threshold value; and
determining a severity of the process disturbance based upon the combination of the relationship between the measured drive gain and the drive gain threshold value and the relationship between the measured pick-off amplitude and the pick-off amplitude threshold value.

2. The method for detecting a process disturbance according to claim 1, wherein the relationship between the measured drive gain and the drive gain threshold is whether the measured drive gain is substantially equal to the drive gain threshold value.

3. The method for detecting a process disturbance according to claim 1, wherein the relationship between the measured pick-off amplitude and the pick-off amplitude threshold value is whether the measured pick-off amplitude is greater than the pick-off amplitude threshold value.

4. The method for detecting a process disturbance according to claim 1, wherein the relationship between the measured pick-off amplitude and the pick-off amplitude threshold value is whether the measured pick-off amplitude is less than the pick-off amplitude threshold value.

5. The method for detecting a process disturbance according to claim 1, wherein:
the relationship between the measured drive gain and the drive gain threshold is whether the measured drive gain is substantially equal to the drive gain threshold value; and
the relationship between the measured pick-off amplitude and the pick-off amplitude threshold value is whether the measured pick-off amplitude is greater than the pick-off amplitude threshold value.

6. The method for detecting a process disturbance according to claim 1, wherein:
the relationship between the measured drive gain and the drive gain threshold is whether the measured drive gain is substantially equal to the drive gain threshold value; and
the relationship between the measured pick-off amplitude and the pick-off amplitude threshold value is whether the measured pick-off amplitude is less than the pick-off amplitude threshold value.

7. The method for detecting a process disturbance according to claim 1, wherein the method further comprises outputting information, recommending one or more actions, or performing one or more actions that reduce the severity of the process disturbance or reduce a deleterious affect the process disturbance has on accuracy of a characteristic measured by the vibrating flow device.

8. An article of manufacture for detecting a process disturbance generated from entrained gas or particulates within a fluid flowing in a conduit of a vibrating flow device, comprising a tangible computer program product comprising non-transitory computer usable medium including executable code for executing a process for detecting the process disturbance, the process comprising:
detecting the presence of the process disturbance based upon a combination of a relationship between a measured drive gain of a drive signal provided to a drive configured to vibrate the conduit and a drive gain threshold value and a relationship between a measured pick-off amplitude of a signal from a pick-off configured to measure a motion of the conduit and a pick-off amplitude threshold value; and determining a severity of the process disturbance based upon the combination of the relationship between the measured drive gain and the drive gain threshold value and the relationship between the measured pick-off amplitude and the pick-off amplitude threshold value.

9. A system for detecting a process disturbance generated from entrained gas or particulates within a fluid flowing in a vibrating flow device (5), comprising:

at least one conduit (103A) configured to receive the fluid;

at least one drive (104) that is configured to vibrate the at least one conduit (103A);

at least one pick-off (105) that is configured to measure the motion of the at least one conduit (103A);

one or more electronics (20) that are configured to:

detect the process disturbance based upon a comparison of a relationship between a measured drive gain of a drive signal provided to the at least one drive (104) and a drive gain threshold value and a relationship between a measured pick-off amplitude of a signal from the pick-off (105) and a pick-off amplitude threshold value; and determine a severity of the process disturbance based upon the comparison of the relationship between the measured drive gain and the drive gain threshold value and the relationship between the measured pick-off amplitude and the pick-off amplitude threshold value.

* * * * *